United States Patent
Cooley

[11] 3,872,401
[45] Mar. 18, 1975

[54] LASER ASSEMBLY INCLUDING A CRYSTALLINE LASER DISC WITH AN ANNULAR GLASS COATING

[75] Inventor: Richard F. Cooley, Toledo, Ohio
[73] Assignee: Owens-Illinois, Inc., Toledo, Ohio
[22] Filed: Jan. 8, 1974
[21] Appl. No.: 431,798

[52] U.S. Cl............................................. 331/94.5 E
[51] Int. Cl............................................. H01s 3/02
[58] Field of Search..................... 331/94.5; 330/4.3

[56] References Cited
UNITED STATES PATENTS
3,628,172  12/1971  Matovich ..................... 331/94.5 E
3,805,186  4/1974  Woodcock .................... 331/94.5 E
3,808,549  4/1974  Maurer ........................ 331/94.5 E Primary Examiner—William L. Sikes
Attorney, Agent, or Firm—Richard D. Heberling; E. J. Holler

[57] ABSTRACT

A laser assembly is disclosed, the laser assembly including a crystalline laser disc, such as a ruby disc, that has an annular glass coating for absorbing energy at the lasing wavelength to thereby prevent parasitic oscillations. The preferred glass coating for a ruby laser disc is a barium oxide lead borate glass containing $SiO_2$, ZnO and an effective energy-absorbing amount of copper oxide to prevent parasitic oscillations.

9 Claims, 3 Drawing Figures

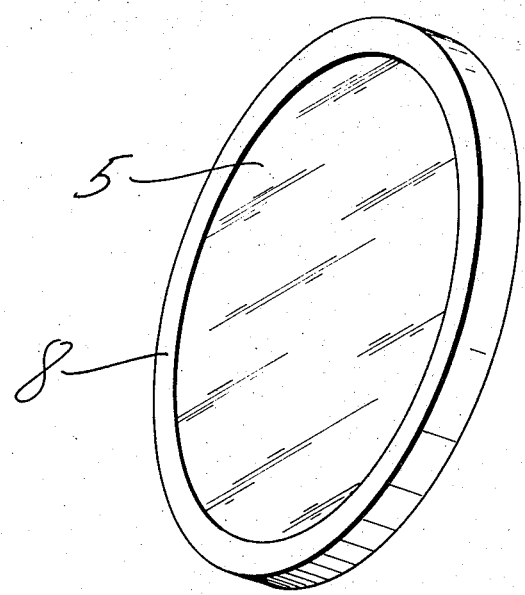
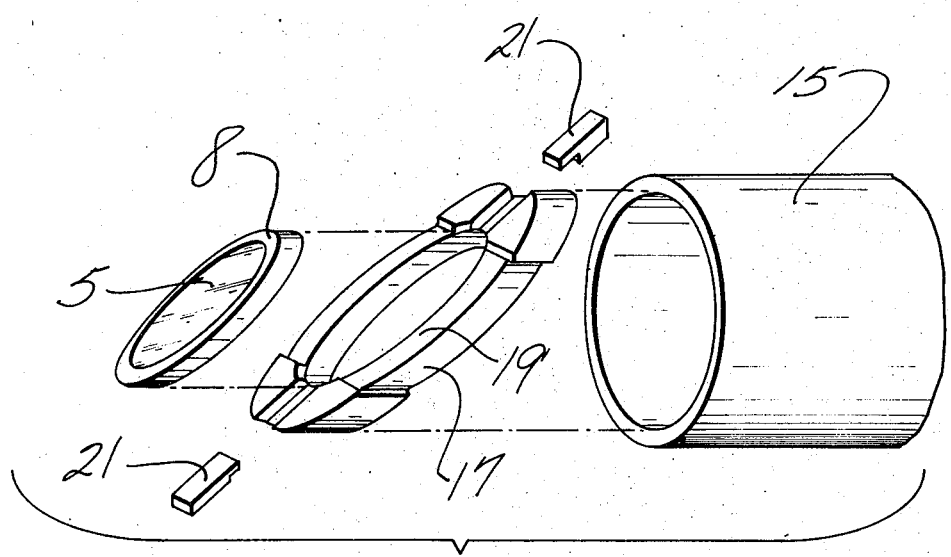

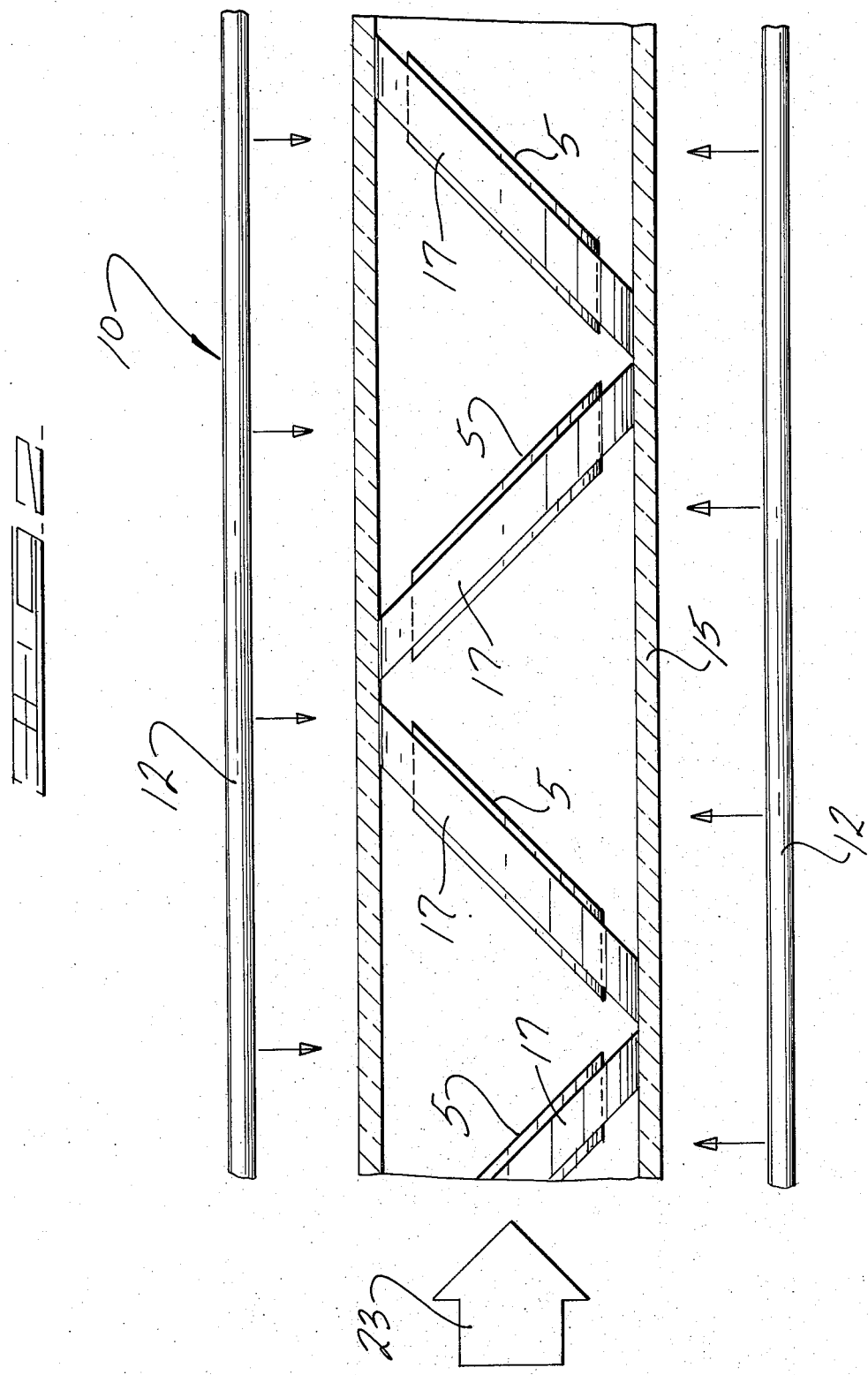

LASER ASSEMBLY INCLUDING A CRYSTALLINE LASER DISC WITH AN ANNULAR GLASS COATING

INVENTION

This invention relates to a laser assembly that includes a crystalline laser disc, such as a ruby disc, that has an annular lead borate glass coating containing an effective amount of copper oxide for absorbing energy at the lasing wavelength to prevent parasitic oscillations.

The invention also relates to the new use of a glass coating for a crystalline laser disc, the new use including:

coating the crystalline disc with a lead borate glass containing an effective energy-absorbing amount of copper oxide that absorbs energy at the lasing wavelength to provide an annular coating on the disc;

pumping the disc to cause an energy inversion; and passing monochromatic light through the disc to cause stimulated emission and also absorb energy at the lasing wavelength in the annular glass coating to thereby prevent parasitic oscillations.

It is an object of the present invention to provide a crystalline laser disc having an annular lead borate glass coating capable of absorbing energy at the lasing wavelength to thereby absorb parasitic oscillations, the glass coating having an index of refraction not less than the index of refraction of the disc, and is generally the same as or slightly greater than the index of refraction of the disc the thermal expansion and contraction of the coating being sufficiently compatible with the disc so as to prevent the development of an undesirable stress level therein; the glass coating including an effective energy-absorbing amount of copper oxide that absorbs energy at the lasing wavelength.

It is an object of the present invention to provide a laser assembly comprising:

means for providing a source of pumping light;

a lasing material comprising at least one crystalline laser disc that is made preferably of a ruby material for causing stimulated emission;

means for defining a cavity having a housing and the lasing material therewithin; and means for holding the crystalline disc within the housing; the disc having an annular coating comprising a lead borate glass containing an effective energy-absorbing amount of copper oxide to absorb energy at the lasing wavelength to thereby absorb any parasitic oscillations.

It is an object of the present invention to provide the new use of a glass coating for a crystalline laser disc, the new use comprising the steps of:

a. coating the crystalline disc with a lead borate glass containing an effective energy-absorbing amount of copper oxide for absorbing energy at the lasing wavelength to thereby provide an annular coating around the peripheral edge of the disc;

b. pumping the disc to cause an energy inversion; and c. passing monochromatic light through the disc to cause stimulated emission and also absorb energy at the lasing wavelength in the annular glass coating to thereby prevent parasitic oscillations.

These and other objects will become apparent from the specification that follows, the appended claims and the drawings, in which:

FIG. 1 is a perspective view of a crystalline laser disc having an annular glass coating for absorbing parasitic oscillations in accordance with the present invention;

FIG. 2 is a fragmentary, side elevational view of a laser assembly that includes a plurality of the coated crystalline laser discs, within the housing of the assembly; and FIG. 3 is a perspective exploded view of a crystalline laser disc having the annular coating and means for holding the disc in the laser assembly.

The present invention provides a crystalline laser disc having an annular lead borate glass coating capable of absorbing energy at the laser wavelength to thereby absorb parasitic oscillations, the glass coating having an outstanding combination of properties for use in a laser assembly, the properties including an index of refraction not less than the index of refraction of the disc, the thermal expansion and contraction properties of the coating being sufficiently compatible with the disc, so as to prevent the development of an undesirable stress level in the disc, the glass coating including an effective, energy-absorbing amount of copper oxide that absorbs energy at the lasing wavelength.

The present invention also provides an outstanding laser assembly, the laser assembly comprising:

means for providing a source of pumping light;

a lasing material comprising at least one crystalline laser disc such as a ruby disc for causing stimulated emission;

means for defining a cavity having a housing and the laser material therewithin; and means for holding a crystalline laser disc within the housing; the disc having an annular coating comprising a lead borate glass capable of absorbing energy at the lasing wavelength to thereby absorb any parasitic oscillations; the glass coating including copper oxide in an effective, energy-absorbing amount to absorb energy within the coating.

The present invention provides the new use of a glass coating for a crystalline laser disc, the new use comprising the steps of:

a. coating the crystalline disc with a lead borate glass containing an effective, energy-absorbing amount of copper oxide that absorbs energy at the lasing wavelength to provide an annular coating on the disc;

b. pumping the disc to cause an energy inversion; and c. passing monochromatic light through the disc to cause stimulated emission and also absorb energy at the lasing wavelength in the annular glass coating to thereby prevent parasitic oscillations.

As seen in FIGS. 1 and 2, a crystalline laser disc 5 is provided with an annular glass coating 8 that has an effective energy-absorbing amount of copper oxide to prevent undesirable parasitic oscillations.

The undesirable effects of parasitic oscillations is described, for instance, in U.S. Pat. No. 3,508,165 to Nicolai. This patent is incorporated by reference for its disclosure of the problem of parasitic oscillations or a pumping due to the whispering mode of operation in which a wave front is internally reflected several times along an internal path within the disc.

As seen in FIG. 2, the laser assembly 10 is provided that includes flash tubes 12 as a means for providing a source of pumping light. There is provided means for defining a cavity within the flash tubes in the laser assembly including a substantially cylindrical housing 15. Also provided is means for holding the crystalline laser disc in the cavity, including a plurality of holding members 17 that are attached to the housing and adapted for holding the discs 5. As seen in the exploded view (FIG. 3) of the disc 5 and the holder 17 in the embodiment, the disc is conveniently held on one face 19 of the holder by means of fastening members 21.

The laser assembly is operated usually as an amplifier rather than an oscillator, with a source of monochromatic light that provides a beam of monochromatic light such as a laser beam indicated by the arrow 23. The discs in the assembly are pumped by the flashlight to cause an energy inversion, and the monochromatic light beam 23 is passed through each of the discs to cause stimulated emission. At the same time, parasitic oscillation is prevented by the absorbing of energy at the lasing wavelength by the annular glass coating 8 on each of the discs.

The outstanding crystalline laser disc, with its annular coating for absorbing energy at the lasing wavelength, can be prepared by coating a laser disc with an easily processable and formable lead borate glass having an effective energy-absorbing amount of CuO for absorbing energy at the lasing wavelength.

Copper oxide in the glass coating composition is reported as CuO, although the oxide is usually present as CuO and $Cu_2O$ with CuO probably being the major portion.

In general, the CuO is present in the glass coating composition in an amount of about 1 to 10 percent by weight and preferably 2 to 7 percent by weight.

Suitable, preferred and optimum glass coatings utilizing CuO as the energy-absorbing oxide for a ruby laser disc have the following approximate composition, it being understood that the oxides listed are present in the batch:

|  | GENERAL | PREFERRED | OPTIMUM |
|---|---|---|---|
| $SiO_2$ | 7.0 – 10.0 | 7.5 – 9.0 | 8.6 |
| $B_2O_3$ | 15.0 – 20.0 | 16.0 – 19.0 | 17.3 |
| $Al_2O_3$ | 1.0 – 3.0 | 1.25 – 2.0 | 1.5 |
| PbO | 30.0 – 50.0 | 35.0 – 45.0 | 39.2 |
| BaO | 1.0 – 2.5 | 1.25 – 2.0 | 1.4 |
| ZnO | 20.0 – 30.0 | 22.0 – 29.0 | 26.2 |
| CuO | 4.0 – 10.0 | 4.5 – 7.0 | 5.8 |

Excellent results have been obtained by using the above-described optimum glass coating.

In general, preferred optimum ranges utilizing CuO as the energy-absorbing oxide for a Yag (Yttrium aluminum garnet) lasing disc have the following approximate composition in weight percent, it being understood that the oxides listed are present in the batch.

|  | GENERAL | PREFERRED | OPTIMUM |
|---|---|---|---|
| $SiO_2$ | 2.0 – 6.0 | 2.5 – 4.0 | 3.0 |
| $Al_2O_3$ | 2.0 – 5.0 | 2.5 – 4.0 | 3.1 |
| $B_2O_3$ | 12.0 – 20.0 | 14.0 – 18.0 | 16.0 |
| PbO | 55.0 – 70.0 | 59.0 – 68.0 | 62.9 |
| BaO | 2.0 – 5.0 | 2.5 – 4.0 | 3.0 |
| ZnO | 6.0 – 11.0 | 7.0 – 10.0 | 8.9 |
| CuO | 2.0 – 10.0 | 2.5 – 7.0 | 3.1 |

In general, the low-melting lead borate glasses also provide an index of refraction in the annular coating that is not less than the index of refraction of the disc and is generally the same or slightly greater than the index of refraction of the disc. Usually, the lead borate glass coatings have an index of refraction in the range of about 1.8 or 1.9 as compared to an index of refraction of about 1.78 for a ruby disc or about 1.83 for a Yag disc.

The melting techniques used to melt the lead borate compositions are well known in the art. In general, the melting techniques for lead borate glasses include the melting of the batch compositions in a platinum crucible or platinum lined furnace that is preferably electrically heated. Generally, the batch compositions are melted at about 2400°F. for about 4 hours. The resultant lead borate glass, when thoroughly heated and homogenized, is then quenched by conventional fritting techniques to form glass frit. The resultant glass frit is generally ground dry for around 2 hours in a ball mill using alumina rods to provide a powdered glass that is screened to about a 100 mesh size. The powdered glass is prepared for a coating for discs by adding isobutyl alcohol and wet milling for about 24 hours. The material has 100 percent of its particles less than about 12 microns. As is conventional in the art, a binder such as nitrocellulose is added to the finely ground material and generally the material is applied to the discs by, for instance, dipping or spraying. Thereafter, the coatings can be conveniently heated to about 914°F. (about 490°C.) for about 1 hour. The temperature employed generally must be sufficient to cause the coating glass to melt and flow evenly onto the edges of the laser disc. Thereafter, the disc is cooled at a predetermined rate sufficient so as not to create an undesirable stress level in the crystalline dish. However, the temperature should not be so high as to cause the material to flow over the edge of the disc onto the face thereof. In general, the time and temperature employed in fusing the coating onto the disc is dependent upon the thickness of the coating and the mass of the disc.

The lead borate coatings generally have a thickness ranging as low as about 1 micron to as high as about 1 millimeter (1,000 microns), and preferably, the coatings are at least 2 to 3 microns in thickness with about 4 to 10 or 12 microns being a preferred range.

The following example is intended to illustrate the present invention and not to limit the same in any way.

EXAMPLE

A ruby laser disc such as shown in FIG. 1 was prepared having a circular shape with a 1 inch diameter and a thickness of about ¼ inch. The resultant disc was coated with a lead borate glass composition having the following approximate composition:

| Ingredients | Percent by Weight |
|---|---|
| $SiO_2$ | 8.6 |
| $B_2O_3$ | 17.3 |
| $Al_2O_3$ | 1.5 |
| PbO | 39.2 |
| BaO | 1.4 |
| ZnO | 26.2 |
| CuO | 5.8 |

The above glass coating composition was prepared from raw batch materials, as is well known in the art, and the composition applied to the outer periphery of the disc and fused thereto. The thickness of the glass coating containing the CuO as the energy-absorbing disc can be used in a laser assembly as shown in FIG.

3 and excellent performance obtained without excess damage to the disc from its use. In the above example, other lead borate glass compositions previously described as being useful and containing CuO as the energy-absorbing oxide, can be used in place of the particular lead borate glass composition to coat the crystalline disc, to provide substantially equivalent results.

Other suitable crystalline laser discs can be substituted for the ruby disc used in the above-described example. Other crystalline hosts can be used, such as the garnets, preferably yttrium aluminum garnet or calcium tungstate, which commonly are doped with trivalent neodymium, which has a lasing wave length of about 1.06 microns.

What is claimed is:

1. A crystalline laser disc having an annular lead borate glass coating capable of absorbing energy at the lasing wavelength to thereby absorb parasitic oscillations, the glass coating having an index of refraction not less than the index of refraction of the crystalline disc, the thermal expansion and contraction of the coating being sufficiently compatable with the disc to prevent the development of an undesirable stress level therein; the glass coating including barium oxide and $Al_2O_3$ and an effective amount of copper oxide that absorbs energy at a wavelength of about 1.06 microns.

2. A disc as defined in claim 1 in which the glass composition comprises the following ingredients in approximate percentages by weight:

| | |
|---|---|
| $SiO_2$ | 7 – 10 |
| $B_2O_3$ | 15 – 20 |
| $Al_2O_3$ | 1 – 3 |
| PbO | 30 – 50 |
| BaO | 1 – 2.5 |
| ZnO | 20 – 30 |
| CuO | 4 – 10. |

3. A disc as defined in claim 1 in which the glass composition has the following ingredients in their respective percent by weight:

| | |
|---|---|
| $SiO_2$ | 2 – 6 |
| $Al_2O_3$ | 2 – 5 |
| $B_2O_3$ | 12 – 20 |
| PbO | 55 – 70 |
| BaO | 2 – 5 |
| ZnO | 6 – 11 |
| CuO | 2 – 10. |

4. A disc as defined in claim 2 in which the disc is ruby and the glass composition of the coating has the following ingredients in their respective approximate percent by weight:

| | |
|---|---|
| $SiO_2$ | 7.5 – 9 |
| $B_2O_3$ | 16 – 19 |
| $Al_2O_3$ | 1.25 – 2 |
| PbO | 35 – 45 |
| BaO | 1.25 – 2 |
| ZnO | 22 – 29 |
| CuO | 4.5 – 7. |

5. A disc as defined in claim 4 in which the glass composition of the coating has the following ingredients in their respective percent by weight:

| | |
|---|---|
| $SiO_2$ | 8.6 |
| $B_2O_3$ | 17.3 |
| $Al_2O_3$ | 1.5 |
| PbO | 39.2 |
| BaO | 1.4 |
| ZnO | 26.2 |
| CuO | 5.8. |

6. A disc as defined in claim 3 in which the disc is yttrium aluminum garnet and the glass composition has the following ingredients in their respective percent by weight:

| | |
|---|---|
| $SiO_2$ | 2.5 – 4 |
| $Al_2O_3$ | 2.5 – 4 |
| $B_2O_3$ | 14 – 18 |
| PbO | 59 – 68 |
| BaO | 2.5 – 4 |
| ZnO | 7 – 10 |
| CuO | 2.5 – 7. |

7. A disc as defined in claim 6 in which the glass composition has the following ingredients in their respective percent by weight:

| | |
|---|---|
| $SiO_2$ | 3 |
| $Al_2O_3$ | 3.1 |
| $B_2O_3$ | 16 |
| PbO | 62.9 |
| BaO | 3 |
| ZnO | 8.9 |
| CuO | 3.1. |

8. A laser assembly comprising:

means for providing a source of pumping light;

means for defining a cavity having a lasing material including a housing;

means for holding a crystalline laser disc within the housing;

a crystalline laser disc located within the housing for causing stimulated emission; the disc having an annular coating; the coating comprising a lead borate glass capable of absorbing energy at the lasing wave length to thereby absorb any parasitic oscillations, the glass coating having an index of refraction not less than the index of refraction of the crystalline disc, the thermal expansion and contraction of the coating being sufficiently compatable with the laser disc so as to prevent the development of undesirable stresses in the disc, the glass coating including an effective energy-absorbing amount of copper oxide that absorbs energy at the lasing wave length.

9. The new use of a glass coating for a crystalline laser disc the new use comprising the steps of:

a. coating the crystalline disc with a lead borate glass containing an effective energy-absorbing amount of copper oxide that absorbs energy at the lasing wave length to provide an annular coating on the disc;

b. pumping the disc to cause an energy inversion; and c. passing monochromatic light through the disc to cause stimulated emission and also absorb energy at the lasing wave length in the annular glass coating to thereby prevent parasitic oscillations.

* * * * *